United States Patent [19]
Ikegame

[11] Patent Number: 6,002,660
[45] Date of Patent: Dec. 14, 1999

[54] INFORMATION RECORDING/REPRODUCING APPARATUS WHEREIN SINGLE-SIDED AND DOUBLE-SIDED CARTRIDGES CAN BE INSERTED AND HAVING WRONG INSERTION PREVENTING MECHANISM

[75] Inventor: Tetsuo Ikegame, Hachioji, Japan

[73] Assignee: Olympus Optical Co., Ltd., Tokyo, Japan

[21] Appl. No.: 08/633,496

[22] Filed: Apr. 17, 1996

[30] Foreign Application Priority Data

Apr. 25, 1995 [JP] Japan ................................. 7-100988

[51] Int. Cl.⁶ .................................................. G11B 17/04
[52] U.S. Cl. ...................................... 369/77.2; 360/99.06
[58] Field of Search .................................. 369/77.2, 75.2; 360/99.06, 99.02, 99.07, 99.03

[56] References Cited

U.S. PATENT DOCUMENTS

| | | | |
|---|---|---|---|
| 4,731,776 | 3/1988 | Ishii et al. | 369/291 |
| 5,040,167 | 8/1991 | Tanaka et al. | 369/291 |
| 5,063,554 | 11/1991 | Uehara | 360/99.06 |
| 5,113,297 | 5/1992 | Yoshida | 360/99.06 |
| 5,163,037 | 11/1992 | Ohmori et al. | 369/291 |
| 5,216,558 | 6/1993 | Griffith et al. | 360/99.06 |
| 5,323,371 | 6/1994 | Nagase et al. | 369/75.2 |
| 5,577,014 | 11/1996 | Kawamura | 369/77.2 |
| 5,610,902 | 3/1997 | Childers et al. | 369/289 |
| 5,612,940 | 3/1997 | Otsuka et al. | 369/77.2 |

FOREIGN PATENT DOCUMENTS

| | | | |
|---|---|---|---|
| 61-246954 | 4/1986 | Japan . | |
| 4255981 | 9/1992 | Japan | 360/77.2 |

*Primary Examiner*—Stuart S. Levy
*Assistant Examiner*—Brian E. Miller
*Attorney, Agent, or Firm*—Frishauf, Holtz, Goodman, Langer & Chick

[57] ABSTRACT

An information recording/reproducing apparatus includes a holder for holding a cartridge inserted therein and loading it into a load position, the holder being capable of holding both a single-sided cartridge containing a recording medium having a recording surface on one side thereof and a double-sided cartridge containing a recording medium having recording surfaces on both sides thereof, a thickness of the double-sided cartridge being the same as that of the single-sided cartridge. A recording/reproducing mechanism is arranged to face one surface of the recording medium loaded in the load position, for recording/reproducing information on/from the one surface, and a wrong insertion preventing mechanism is provided for, when a single-sided cartridge is inserted in the holder so that a non-recording surface faces the recording/reproducing mechanism, detecting the insertion and preventing the cartridge from being loaded into the load position, and when the double-sided cartridge is inserted in the holder, detecting the insertion and allowing the cartridge to be loaded into the load position.

8 Claims, 14 Drawing Sheets

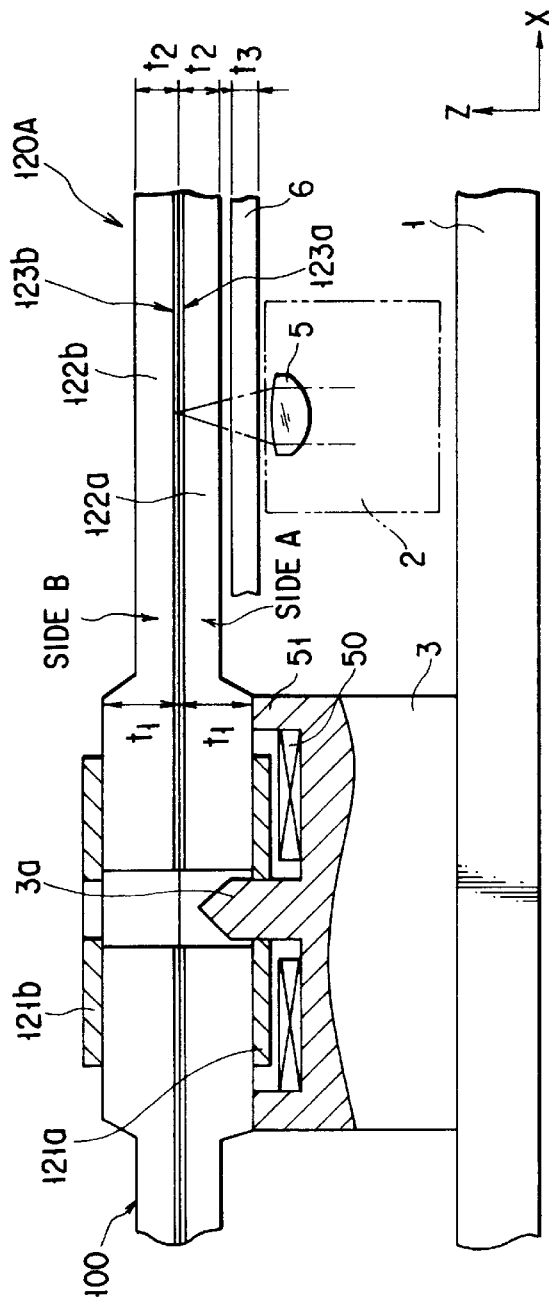
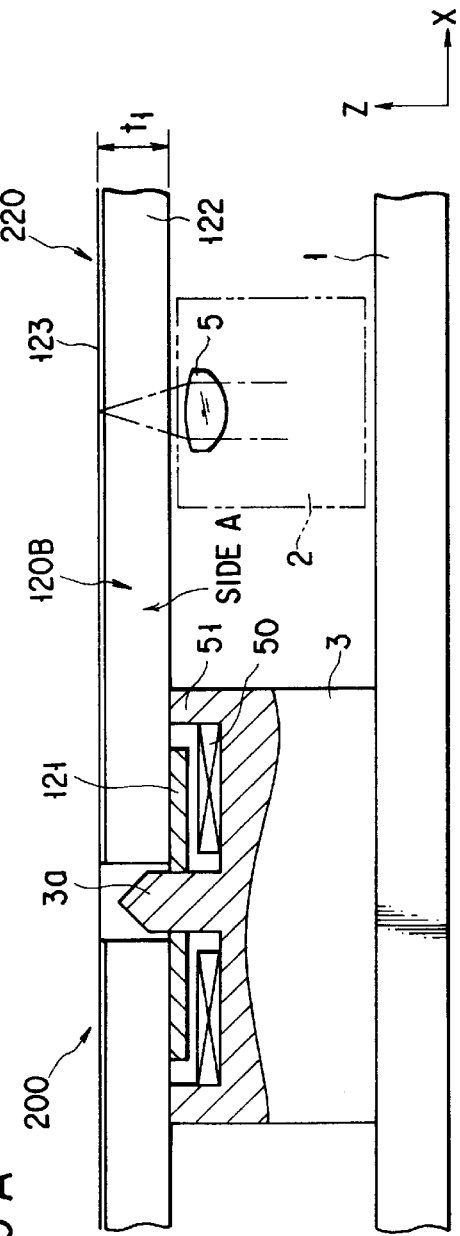
FIG. 3A
FIG. 3B

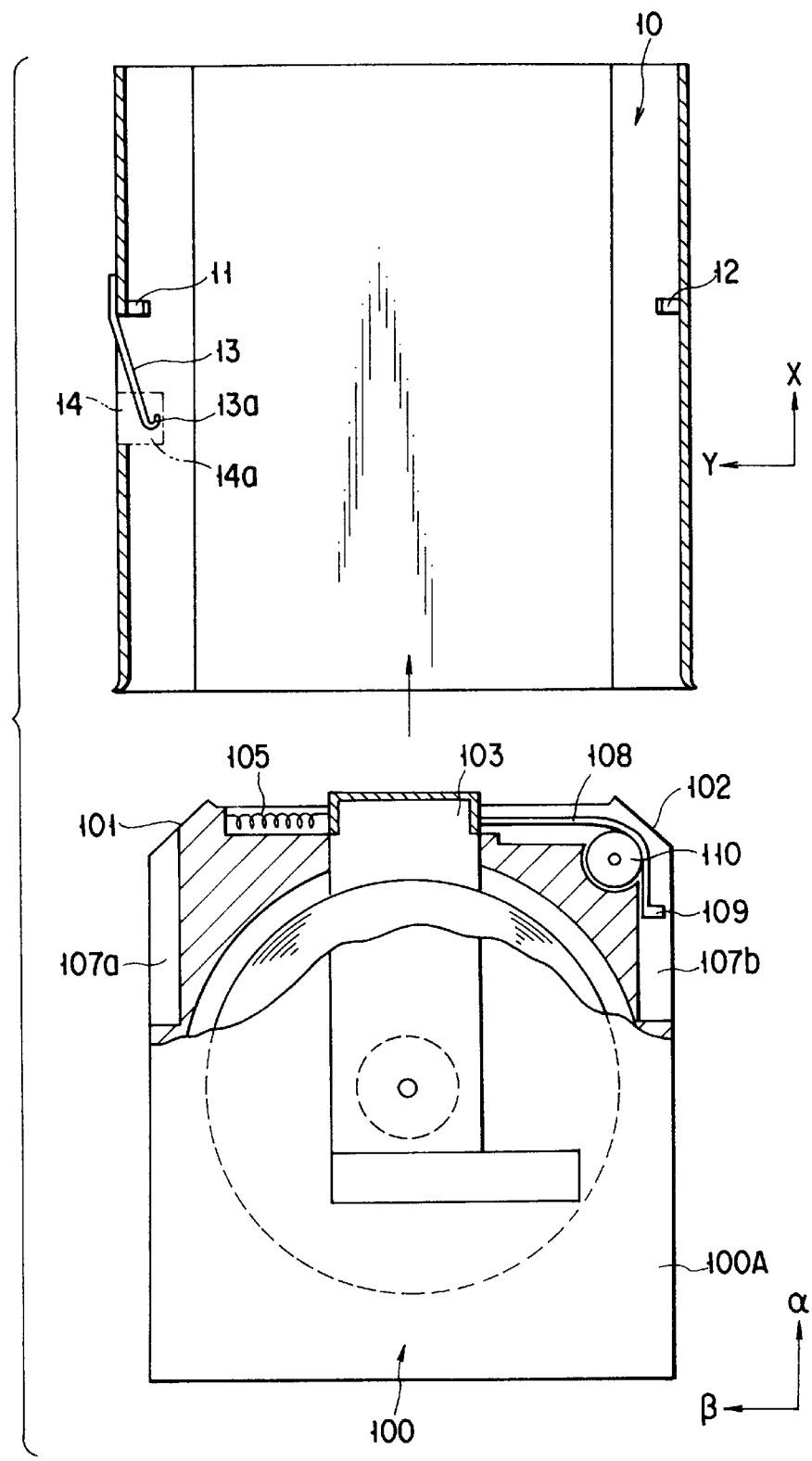
F I G. 5

ALIGNMENT HOLE

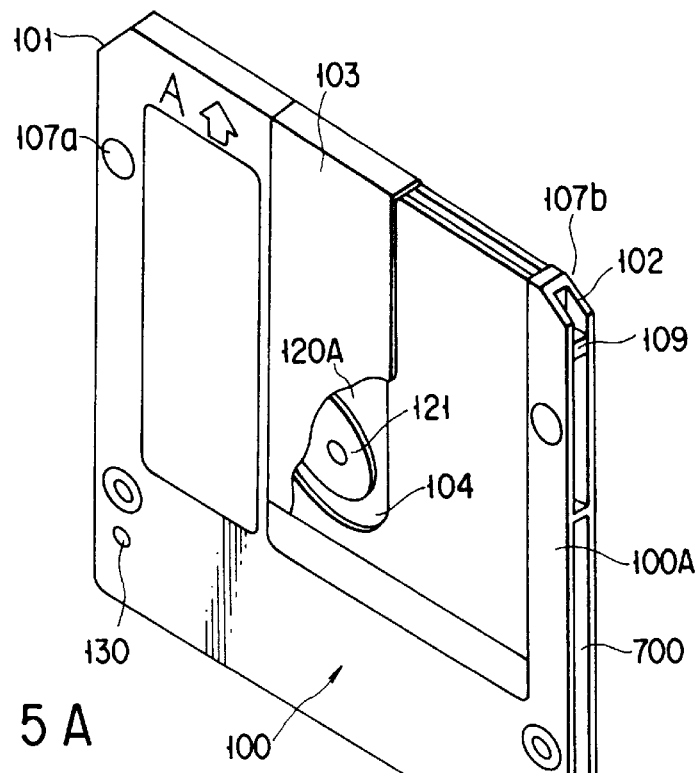
F I G. 15A
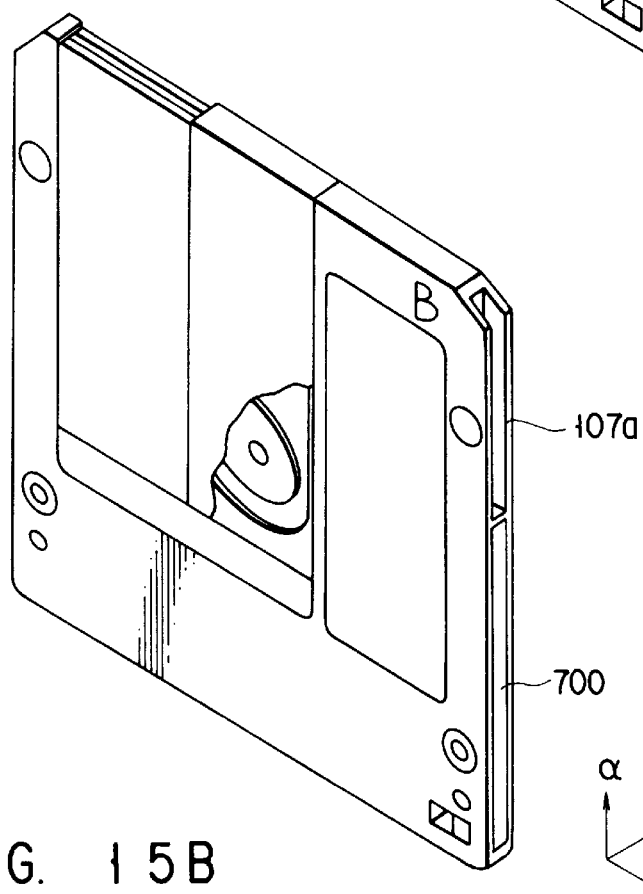
F I G. 15B

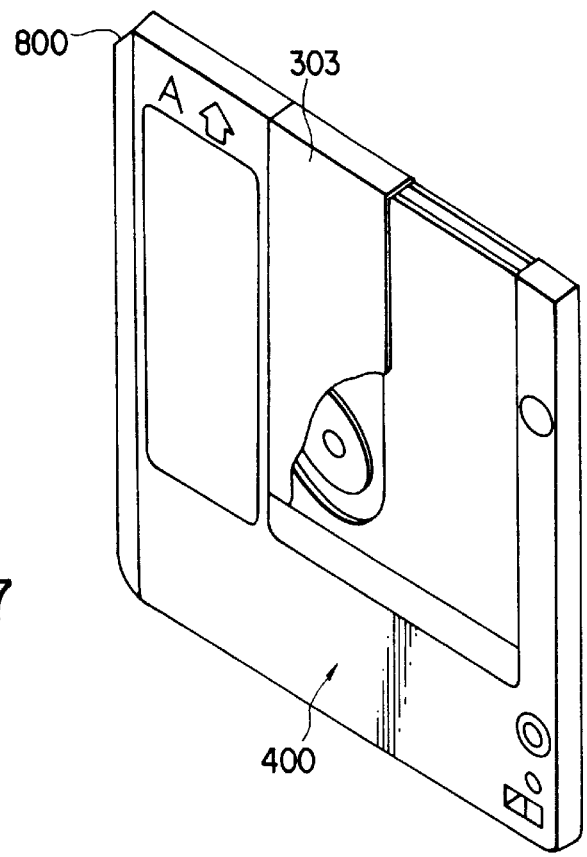
F I G. 17
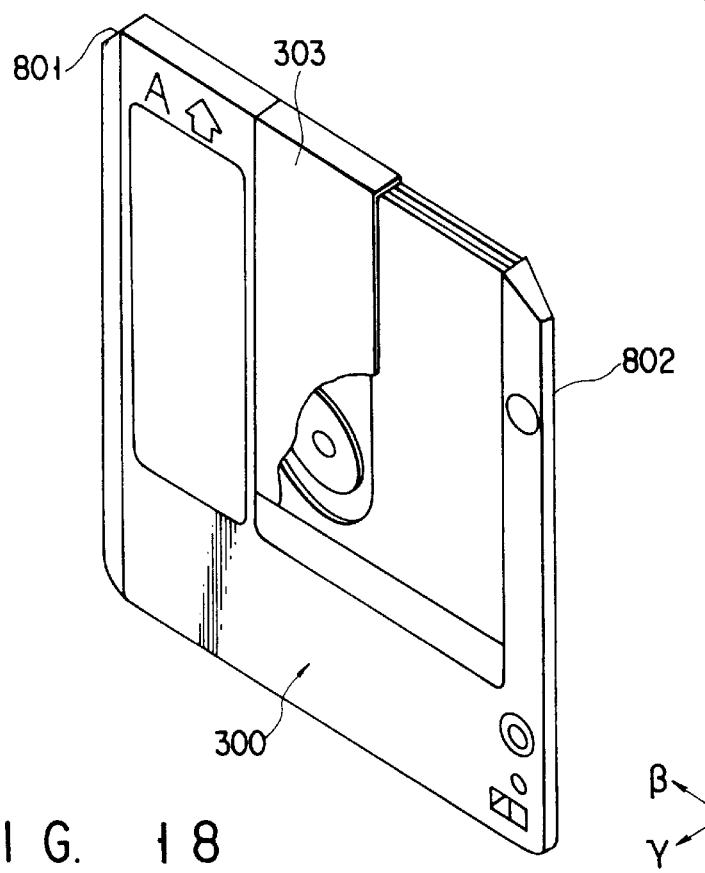
F I G. 18

INFORMATION RECORDING/REPRODUCING APPARATUS WHEREIN SINGLE-SIDED AND DOUBLE-SIDED CARTRIDGES CAN BE INSERTED AND HAVING WRONG INSERTION PREVENTING MECHANISM

BACKGROUND OF THE INVENTION

1. Field of the Invention

The present invention relates to a recording and/or reproducing apparatus for a cartridge containing a recording medium, such as a compact disk, a photomagnetic disk, a phase change recording medium and a magnetic disk.

2. Description of the Related Art

It is known that there are two types of media in the aforementioned recording media: one is a single-sided recording medium, which has only one information recording surface, information being recorded thereon and reproduced therefrom; and the other is a double-sided recording medium, which has two information recording surfaces, information being recorded thereon and reproduced therefrom. The recording medium is housed in a cartridge in advance. The cartridge is inserted in a cartridge holding mechanism, e.g., a cartridge holder, of an information recording/reproducing apparatus, so that it can be placed at a load position, where information is recorded on or reproduced from the medium by a recording/reproducing mechanism, e.g., a recording/reproducing head.

The conventional information recording/reproducing apparatus is adapted for only one of a cartridge containing a single-sided recording medium (hereinafter referred to as a single-sided cartridge) and a cartridge containing a double-sided recording medium (hereinafter referred to as a double-sided cartridge). There has not been developed any practical recording/reproducing apparatus in which two types of cartridges, i.e., single-sided and double-sided cartridges, can be selectively loaded.

Therefore, it is possible that the single-sided cartridge is erroneously loaded into the recording/reproducing apparatus, with the non-recording surface directed to the side of the recording/reproducing mechanism. In this case, the following problems arise.

1. The cartridge is recognized to be improper, only when a recording or reproducing operation is performed after the single-sided cartridge is loaded in the recording/reproducing apparatus. Time is therefore inevitably wasted.

2. If a loading section, which is to be engaged with a rotation shaft of a spindle motor for rotating the recording medium, is not formed on the non-recording surface of the recording medium, the rotation shaft may be brought into contact with the recording medium. In this case, the medium or the spindle motor may be damaged. Further, since the opening of the cartridge is small, a cartridge shutter may abut on the spindle motor, so that the cartridge or the spindle motor may be damaged.

3. Excessive force is applied to a shutter opening mechanism of the cartridge, and the mechanism or the cartridge may be broken.

SUMMARY OF THE INVENTION

An object of the present invention is to provide an information recording/reproducing apparatus, in which single-sided and double-sided cartridges can be selectively loaded, so as to perform recording and reproducing operations, and which will not cause waste of time or damage of elements, even if a single-sided cartridge is erroneously inserted with the recording surface thereof directed to the wrong side.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 3A is a cross-sectional view schematically showing a double-sided optical disk and a part of a recording/reproducing mechanism for recording or reproducing information on or from the disk;

FIG. 3B is a cross-sectional view schematically showing a single-sided optical disk and a part of a recording/reproducing mechanism for recording or reproducing information on or from the disk;

FIG. 5 is a partially cut-out plan view showing a state in which a double-sided disk cartridge is to be inserted in a holder to record or reproduce information on or from a side A of the disk;

FIGS. 12A to 12C are schematic diagrams for explaining insertion of a cartridge into a holder of the information recording/reproducing apparatus according to the second embodiment of the present invention, wherein FIG. 12A shows a case in which a double-sided cartridge is inserted so that information can be recorded on or reproduced from the side A of the disk;

FIG. 12B shows a case in which a double-sided cartridge is inserted so that information can be recorded on or reproduced from the side B of the disk; and FIG. 12C shows a case in which a single-sided cartridge is erroneously inserted with the non-recording surface directed to the side of the recording/reproducing mechanism;

FIGS. 14 to 16 are views showing an example of a wrong insertion preventing mechanism, wherein FIG. 14 is a perspective view showing a single-sided cartridge;

FIGS. 15A and 15B are perspective views showing a double-sided cartridge; and

FIG. 16 is a schematic exploded perspective view showing a cartridge containing an optical disk, a holder for holding the cartridge, and an information recording/reproducing mechanism; and FIGS. 17 to 19 are views showing another example of a wrong insertion preventing mechanism, wherein FIG. 17 is a perspective view showing a single-sided cartridge;

FIG. 18 is a perspective view showing a double-sided cartridge; and

FIG. 19 is a schematic exploded perspective view showing a cartridge containing an optical disk, a holder for holding the cartridge, and an information recording/reproducing mechanism.

DETAILED DESCRIPTION OF THE PREFERRED EMBODIMENTS

Figure 1:
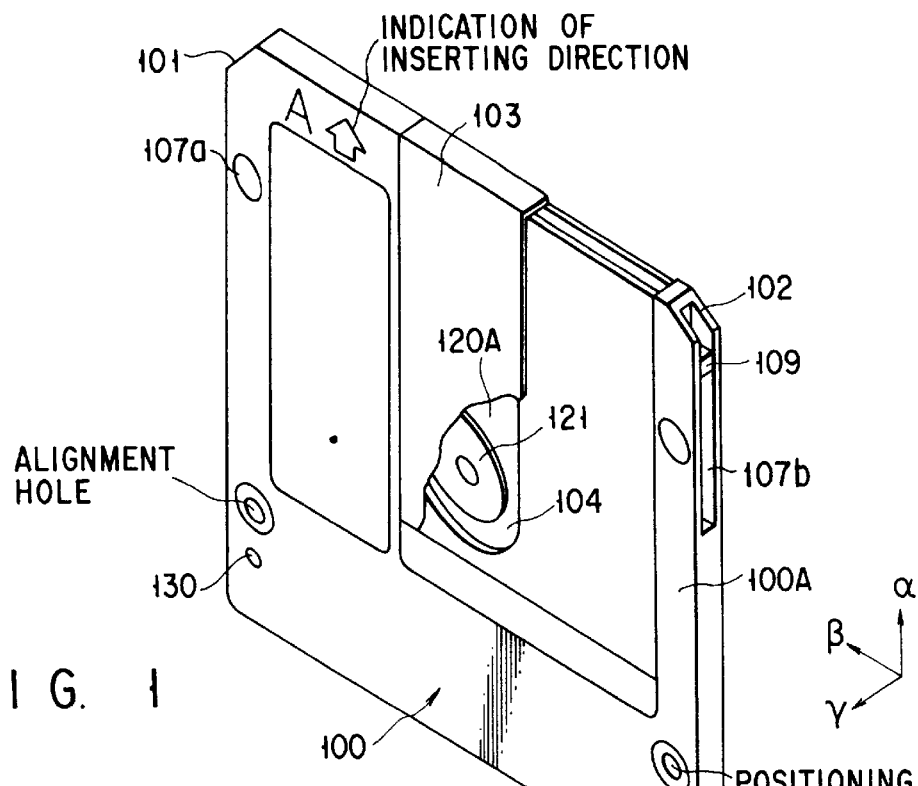
FIG. 1 is a perspective view showing a double-sided disk cartridge for use in an information recording/reproducing apparatus according to a first embodiment of the present invention.

An information recording/reproducing apparatus according to a first embodiment of the present invention will be described with reference to FIGS. 1 to 8, showing an optical disk information recording/reproducing apparatus to which the present invention is applied. In the drawings, symbols $\alpha$, $\beta$ and $\gamma$ represent coordinates on a disk cartridge, while symbols X, Y and Z represent coordinates on an information recording/reproducing apparatus.

Figure 2:
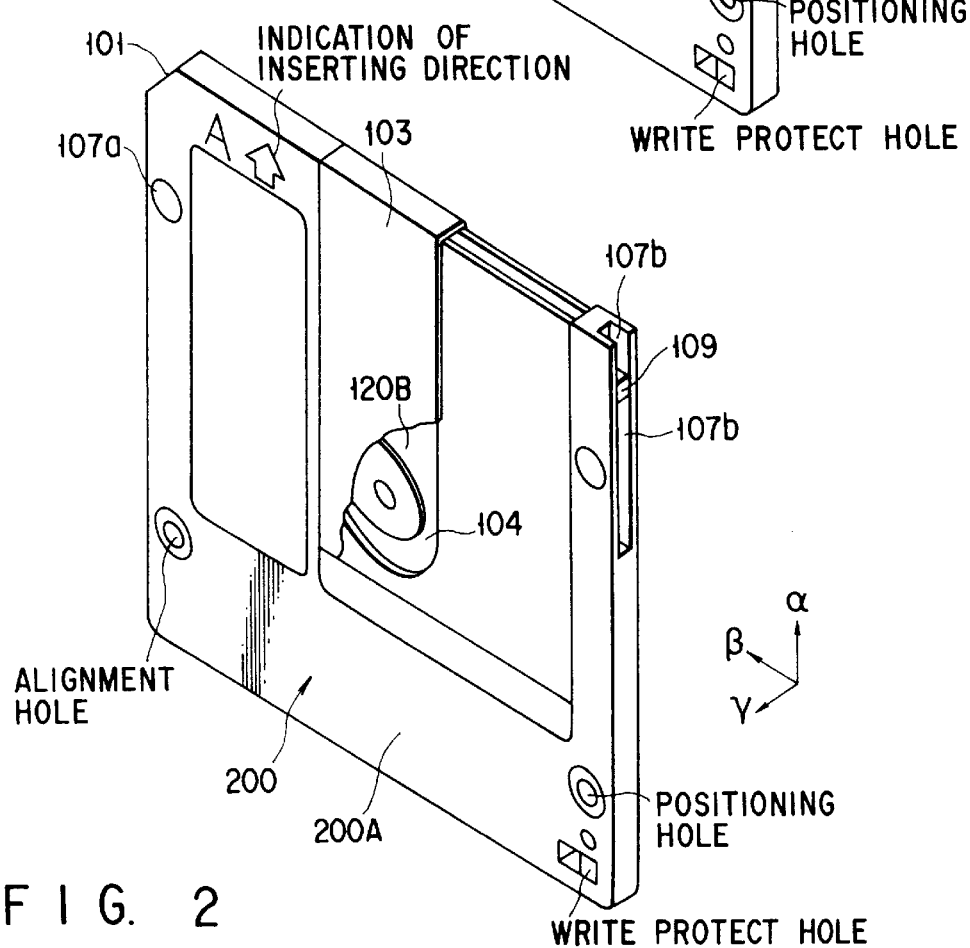
FIG. 2 is a perspective view showing a single-sided disk cartridge for use in the information recording/reproducing apparatus according to the first embodiment of the present invention.

FIG. 1 shows a disk cartridge (double-sided cartridge) 100 which contains a double-sided disk, i.e., a recording medium in which information can be recorded on and reproduced from both sides. FIG. 2 shows a disk cartridge (single-sided cartridge) 200 which contains a single-sided disk, i.e., a recording medium in which information can be recorded on and reproduced from only one side.

The cartridges 100 and 200 respectively comprise substantially square, flat case bodies 100A and 200A formed of synthetic resin and optical disks 120A and 120B rotatably encased in the case bodies. The maximum dimensions of the cartridge 100 in the $\alpha$, $\beta$ and $\gamma$ directions (the length, the width and the thickness) are the same as those of the cartridge 200, although shapes of minor portions of the cartridges are different from each other. Each case body has, in its both sides, head spindle windows 104 extending from a central portion of the case to a front edge thereof. The window 104 allows a hub of the optical disk and part of the optical disk to be exposed therethrough. The window 104 is opened or closed by means of a shutter 103. The shutter 103 has a cross section like an open-ended rectangle and attached to the outer surfaces of the case body so as to sandwich the both sides of the case body 100A or 200A. The shutter 103 is slidable toward sides of the case body (in the $\beta$ direction), between a closed position in which the window 104 is closed as shown in FIGS. 1 and 2 and an opened position in which the window 104 is opened.

As shown in FIG. 5, one end of an extension coil spring 105 is fixed to a side of the case body 100A or 200A, and the other end thereof is connected to one end of the front side (the +$\alpha$ side) of the shutter 103. The spring 105 is extending in the $\beta$ direction in a lateral groove formed in the case body. The shutter 103 is normally biased by the spring 105 in the +$\beta$ direction so as to be maintained at the closed position as shown in FIG. 5. One end of a belt 108 is fixed to the other end of the front side of the shutter 103. The other end of the belt 108 extends in a -$\beta$ direction in the lateral groove, and then curved along a guide roller 110 at about 90° in a -$\alpha$ direction in a second longitudinal slot 107b, which is formed on a second side of the case body so as to communicate with the lateral groove and extend in the -$\alpha$ direction in the case body (a first longitudinal slot 107a, having substantially the same shape as that of the second longitudinal slot 107b, is formed in the corresponding portion of a first side of the case body). The guide roller 110 is rotatably attached to an intersection of the lateral groove and the second longitudinal slot 107b. An engaging claw 109, projecting in the -$\beta$ direction, is formed integral with the distal end of the belt 108 which is located in the second longitudinal slot 107b. With this structure, when the engaging claw 109 is pressed in the -$\alpha$ direction, the belt 108 is pulled and moved in the -$\alpha$ direction in accordance with rotation of the guide roller 110. At this time, the shutter 103 is moved in the -$\beta$ direction against the biasing force of the extension spring 105, so that the window 104 of the case body is opened.

An intersection of the front end of the case body and a side in the +$\beta$ direction, i.e., a corner portion, is chamfered to form an inclined contact surface (a first contact surface) 101. The front end of the first longitudinal slot 107a is exposed through the contact surface.

As shown in FIGS. 1 and 2, each of the disk cartridges 100 and 200 has an arrow indicating the inserting direction, an alignment hole, a write protect hole and so on, which are conventionally known.

Differences between the double-sided cartridge 100 shown in FIG. 1 and the single-sided cartridge 200 shown in FIG. 2 will now be described.

In the case body 100A of the double-sided cartridge 100, an intersection of the front end of the case body and a side in the -$\beta$ direction, i.e., a corner portion, is chamfered to form an inclined contact surface (a second contact surface) 102. The front end of the second longitudinal slot 107b is exposed through the contact surface 102.

A discrimination hole 130 is formed across both surfaces of the double-sided cartridge 100. When the cartridge is inserted in the information recording/reproducing apparatus, a switch of the apparatus detects whether the discrimination hole 130 is present, thereby determining whether the cartridge is double-sided or single-sided. A discrimination hole 130 is not formed in the single-sided cartridge 200.

A double-sided cartridge containing a double-sided optical disk, inserted in the information recording/reproducing apparatus, a rotary driving mechanism, and a pickup mechanism of the recording/reproducing mechanism will be described with reference to FIGS. 3A, 3B and 4.

As shown in FIGS. 3A and 3B, the optical disk 120A held in the double-sided cartridge 100 is formed of two single-sided optical disks, which are adhered back-to-back to each other such that recording surfaces 123a and 123b of the respective disk face the inner surfaces of the sides A and B. Cover glasses 122a and 122b for protecting the recording surfaces of the single-sided optical disks are disk-shaped. Each glass comprises a central portion, which is to be mounted on a turn table 51 rotated by a motor 3 of the recording/reproducing mechanism, and a peripheral portion which is a recording/reproducing section. The thickness t1 (e.g., about 1.2 mm) of the central portion is greater than the thickness t2 (e.g., about 0.6 mm) of the recording/reproducing section. Hubs 121a and 121b, made of metal, are attached to both surfaces of the central portion. When the cartridge is loaded in the recording/reproducing mechanism, the hub located on the side of the motor 3 (the hub identified by the numeral 121a in FIG. 3) is magnetically attracted by a chucking magnet 50, so that the cartridge is clamped on the motor 3. A shaft 3a of the motor 3 is inserted in a hole formed in a center of the hub 121a, with the result that the cartridge is positioned with respect to the mechanism and rotated in accordance with rotation of the turn table 51.

In the single-sided cartridge 200 shown in FIG. 3B, a cover glass 122 of the optical disk 120B has a uniform thickness t1 both in a central portion and a recording/reproducing section. A recording surface 123 is formed on one side of the disk 120B and a hub 121 is formed on the other side thereof.

The motor 3 is fixed to a deck base 1. A pickup mechanism is located between the deck base 1 and the loaded cartridge so as to be movable along the deck base 1 in an radial direction of the optical disk 120A. Above the deck base 1, an auxiliary cover glass 6 is movably arranged so that it can be inserted between an objective lens 5 of the pickup mechanism 2 and an optical disk. The auxiliary cover glass 6 has the thickness t3 equal to the difference between the thickness t1 of the central portion of the optical disk 120A and the thickness t2 of the peripheral portion thereof in order to correct a spherical aberration (in this embodiment, t3=1.2 mm −0.6 mm=0.6 mm). In the case of the single-sided optical disk 120B as shown in FIG. 3B, the auxiliary cover glass 6 is moved so as not be located between the objective lens 5 and the optical disk. In this case, a light beam from the objective lens 5 is directly incident on the optical disk and a beam spot is formed on the recording surface. With this structure, even if the cover glasses of optical disks have different thickness, the glass thickness in total can be adjusted to be the same by inserting or removing the cover glass 6 between the optical disk and the objective lens 5. Therefore, the single objective lens 5 suffices to record or reproduce information on or from both single-sided and double-sided optical disks. The selective movement of the auxiliary cover glass 6 is achieved by controlling a mechanism (not shown) for recognizing the type of the disk by detecting a discriminating hole in the cartridge and driving the auxiliary cover glass 6.

Figure 4:
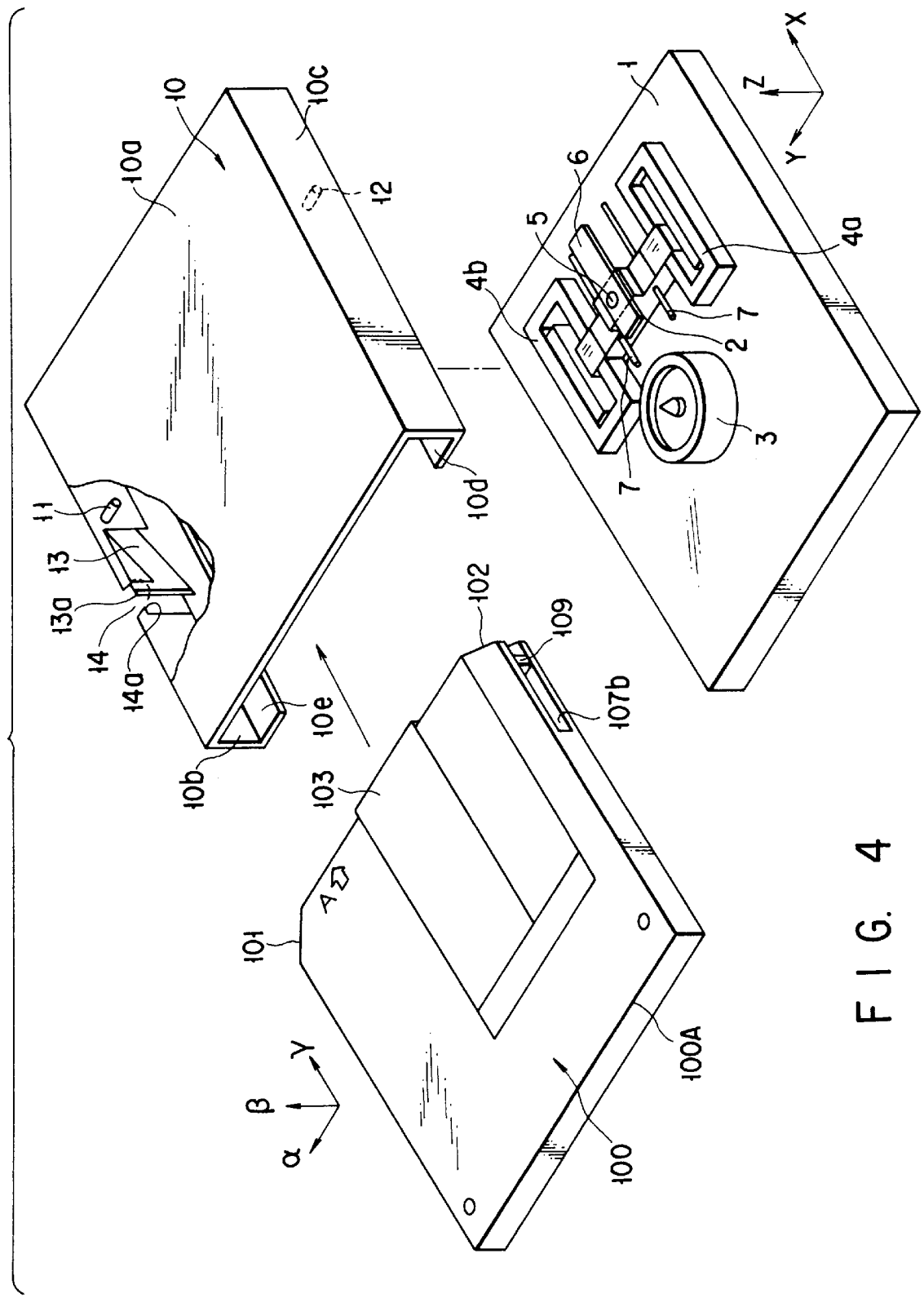
FIG. 4 is a schematic exploded perspective view showing a double-sided disk cartridge for use in the information recording/reproducing apparatus, a holder for holding the disk, and an information recording/reproducing mechanism according to the first embodiment of the present invention.

The pickup mechanism 2, as shown in FIG. 4, is supported by a pair of guide rails 7 so as to be movable in a radial direction of the optical disk, i.e., in an X direction. As is well known, the pickup mechanism 2 can be driven in the X direction by two sets of electromagnetic driving means 4a and 4b, each including a coil and a magnet.

An operation of loading the double-sided cartridge 100 in the recording/reproducing apparatus and mechanisms relating to the operation, particularly a cartridge insertion preventing mechanism, will be described with reference to FIGS. 1, 3A, and 4 to 7.

A cartridge holder 10 is pivotably supported by a front end portion (in a +X direction) of the deck base 1. As shown in FIG. 4, the cartridge holder 10 is constituted by a substantially square upper plate 10a, a pair of side plates 10b and 10c extending from both sides of the upper plate 10a substantially vertically downward, and a pair of lower plate pieces 10d and 10e projecting inward from the lower ends of the side plates in parallel with the upper plate 10a. The distance between the upper plate 10a and the lower plate pieces 10d and 10e is slightly greater than the thickness of the cartridge. The distance between the side plates 10b and 10c is slightly greater than the width of the cartridge. Thus, the cartridge can be inserted in the cartridge holder 10, i.e., a space defined by the upper plate, the lower plate pieces and the side plates. A wrong insertion preventing mechanism for preventing a disk cartridge from being erroneously inserted is provided on one side plate (first side plate) 10b. The preventing mechanism comprises a plate spring (preventing member) 13, a proximal end of which is fixed to the outer surface of the side plate 10b and a free end of which is extending into the interior of the cartridge holder 10 through an opening 14 formed in the side plate 10b. A rectangular cut portion 14a is formed in the upper plate 10a of the holder 10 so as to communicate with the opening 14. The plate spring 13, extending in the −X direction in the holder, is inclined so as to be separated from the side plate 10b. The free end of the plate spring 13 is curved and the upper end thereof is projected in the cut portion 14a, thus forming a contact portion 13a having a width substantially the same as the thickness of the cartridge main body. The upper end projecting portion of the contact portion 13a and the cut portion 14a are set such that, when the upper end projecting portion is pressed forward (in the +X direction), the upper end projecting portion is brought into contact with the front edge of the cut portion 14a, thereby preventing the plate spring 13 from being deformed. First and second engaging pins 11 and 12 are formed in central portions of the inner surfaces in the width direction of the side plates 10b, 10c and between the plate spring 13 and the ends of the side plates in the +X direction, so as to project at right angles from the inner surfaces of the side plates.

Figure 6:
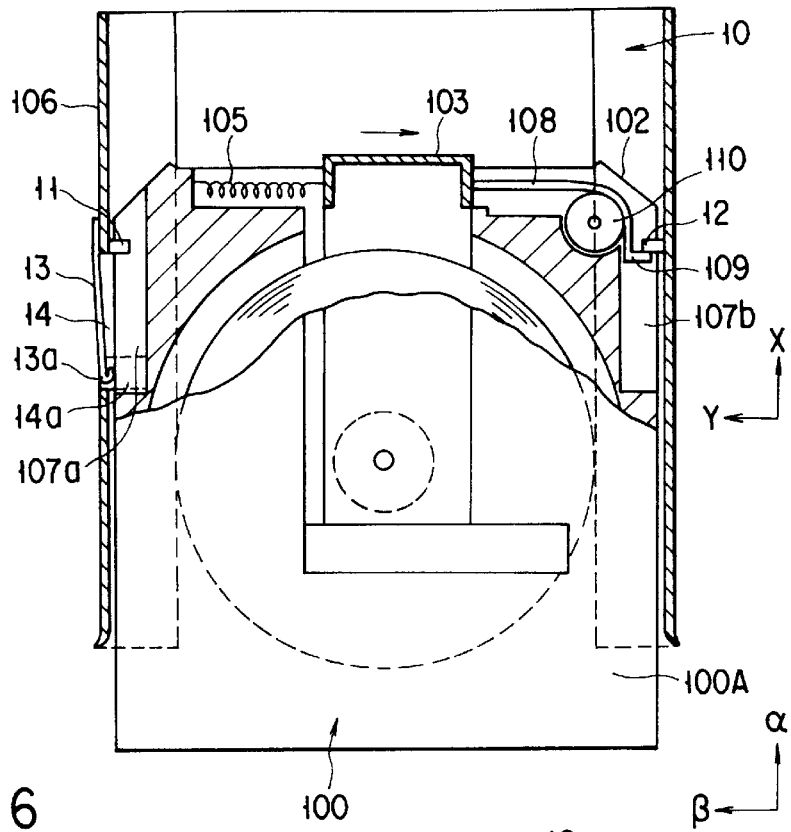
FIG. 6 is a partially cut-out plan view showing a state in which the double-sided disk cartridge is being inserted in the holder to record or reproduce information on or from the side A of the disk.

To record or reproduce information on or from the recording surface 123a (the A-side) of the disk, the double-sided cartridge 100 is inserted through a rear end opening of the cartridge holder 10 as described above with the front side of the disk (the side on which the first and second contact surfaces 101 and 102 are formed) forward, such that the surface with the indication of the inserting direction of the arrow A is directed upward, as shown in FIG. 4. During the insertion, the first contact surface 101 of the cartridge is brought into contact with the contact portion 13a of the plate spring 13. Then, as shown in FIG. 6, the contact portion 13a is moved along the contact surface 101 toward the side plate 10b and enters the opening 14 formed in the side plate 10b. At the same time, the upper end projecting portion of the contact portion 13a is also moved into the cut portion 14a and enters the opening 14. Therefore, the cartridge 100 can be moved to the load position of the holder without being prevented by the spring plate 13. After the cartridge passes by the spring plate 13, the second engaging pin 12 projected from the second side plate 10c of the holder abuts on the engaging claw 109 formed on the belt 108 of the cartridge.

Hence, even if the cartridge is further pressed inward, the engaging claw 109 is maintained at this position (in this time, since the first engaging pin 11 is located in the first groove 107a formed in the case body 100A, it allows insertion of the disk cartridge 100). Accordingly, the belt 108 moves in the direction indicated by the arrow, thereby moving the shutter 103 to the opening position, so that the recording/reproducing section of the optical disk is exposed. When this state is detected by a detecting mechanism (not shown), the cartridge holder 10, in which the cartridge 100A is inserted, is moved to the side of the deck base 1 by a loading mechanism (not shown) and ready to operate with respect to the information recording/reproducing apparatus main body, as shown in FIG. 3A. Thereafter, in the same manner as in the conventional information recording/ reproducing apparatus, the optical disk is rotated by the motor 3, the pickup mechanism 2 is moved in the radial direction of the optical disk, and information is recorded or reproduced on or from the optical disk in accordance with reading of a focus error signal and a tracking error signal.

Figure 7:
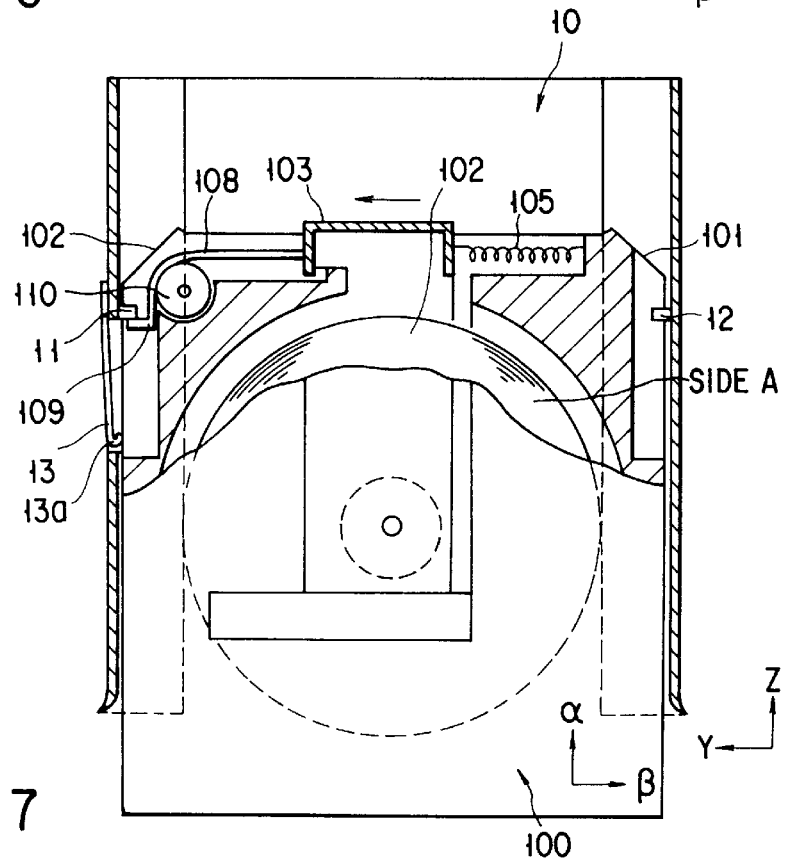
FIG. 7 is a partially cut-out plan view showing a state in which the double-sided disk cartridge is being inserted in the holder to record or reproduce information on or from the side B of the disk.

On the other hand, to record or reproduce information on or from the recording surface 123b (the side B) of the disk, when the double-sided cartridge 100 is inserted in the cartridge holder 10 with the indication of the inserting direction of the arrow B directed upward, the second contact surface 102 of the cartridge is brought into contact with the contact portion 13a of the plate spring 13. As a result, in the same manner as in the case of recording and reproducing of the A-side, the contact portion 13a is moved along the contact surface 102 toward the side plate 10b and enters the opening 14 formed in the side plate 10b, as shown in FIG. 7. For this reason, the cartridge 100 can be moved to the load position of the holder without being prevented by the spring plate 13. After the cartridge passes by the spring plate 13, the first engaging pin 11 projected from the first side plate 10b of the holder abuts on the engaging claw 109 formed on the belt 108 of the cartridge. Thereafter, as in the case of recording and reproducing of the A-side, the shutter 103 is moved to the opening position, so that the recording/ reproducing section of the optical disk is exposed. As described above, both front corners of the disk cartridge 100 are chamfered to form the first and second inclined contact surfaces 101 and 102 serving as preventing/releasing members. Therefore, whether the side A or B is directed to the side of the pickup mechanism, the cartridge can be loaded in the holder to perform a recording or reproducing operation.

Figure 8:
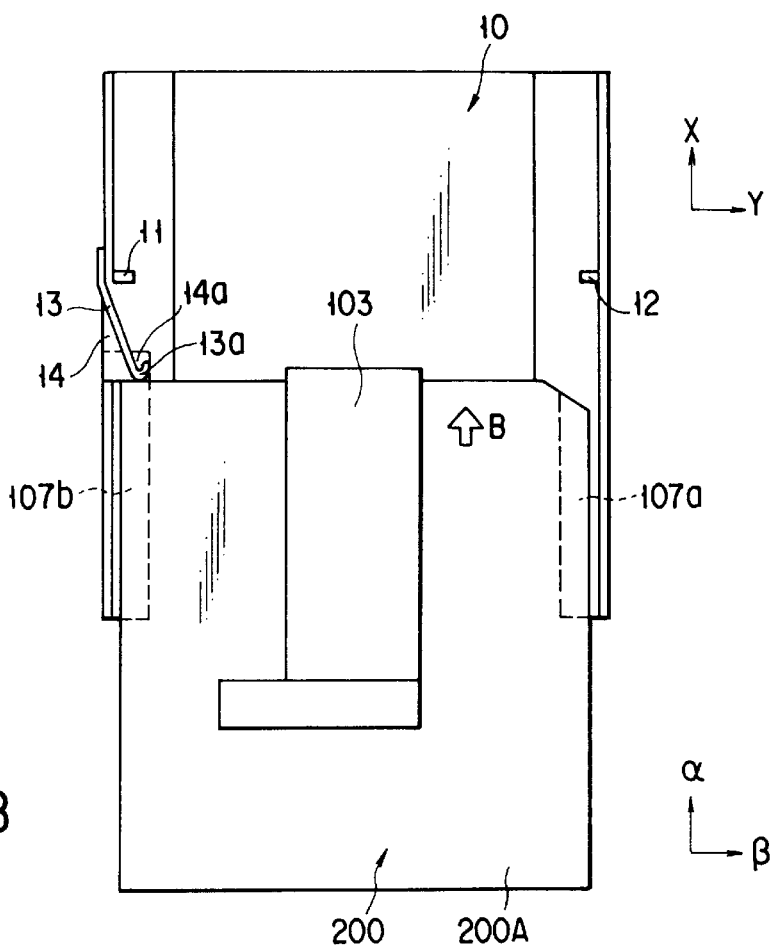
FIG. 8 is a partially cut-out plan view showing a state in which a single-sided disk cartridge is erroneously inserted in the holder, with the non-recording surface directed to the side of the recording/reproducing mechanism.

Next, a case of loading the single-sided cartridge 200 in the information recording/reproducing apparatus main body will be described with reference to FIGS. 2, 3B and 8.

When the single-sided cartridge 200 is inserted in the cartridge holder 10 with the A-side faced the pickup mechanism, the first contact surface 101 presses the contact portion 13a of the plate spring 13 outward, and the engaging claw 109 of the belt 108 is engaged with the second engaging pin 12. As a result, in the same manner as in the case of the double-sided cartridge 100 shown in FIG. 6, the single-sided cartridge 200 is loaded in the holder 10 with the recording/reproducing section exposed. On the other hand, when the single-sided cartridge 100 is inserted in the cartridge holder 10 with the A-side faced opposite to the pickup mechanism (i.e., with the side B of the cartridge directed upward), since the case body 200A does not have a chamfered contact portion at the corner which is opposed to the spring plate 13, the front surface of the corner is brought into contact with the contact portion 13a of the spring plate 13, as shown in FIG. 8, thereby urging the contact portion 13a in the +X direction. However, since the upper end projecting portion of the contact portion 13a abuts on the front edge of the cut portion 14a, further elastic deformation of the plate spring 13 is prevented. As a result, the single-sided cartridge 200 cannot be further moved inward into the holder 10. Thus, the operator can recognize that the cartridge is inserted with the recording/reproducing surface directed in the wrong direction ("the recording/reproducing surface" means both the surface on which information is to be recorded and the surface from which information recorded thereon is to be reproduced, and referred to simply as "the recording surface" in the description).

In the information recording/reproducing apparatus of the above embodiment, if the double-sided cartridge 100 or the single-side cartridge 200 is inserted in the cartridge holder 10 with the rear side forward (in the $-\alpha$ direction), the insertion is prevented by the plate spring 13 in the same manner as in the case where the single-sided cartridge 200 is inserted in the wrong direction, since a chamfered surface is not formed on either corner of the rear side of the case body.

As described above, in the information recording/ reproducing apparatus of this embodiment, if the single-sided cartridge 200 is inserted with the non-recording/ reproducing surface directed to the side of the pickup mechanism, or the double-sided or single sided cartridge 200 or 100 is inserted with the rear side forward, the insertion is detected to prevent erroneous insertion.

Since the shape and the outer sizes of the disk cartridge 100 are the same as those of the disk cartridge 200, the same cartridge holder can be used for both types of the cartridge.

An information recording/reproducing apparatus according to a second embodiment of the present invention will be described with reference to FIGS. 9A and 9B to 12A–12C.

Figure 9A:
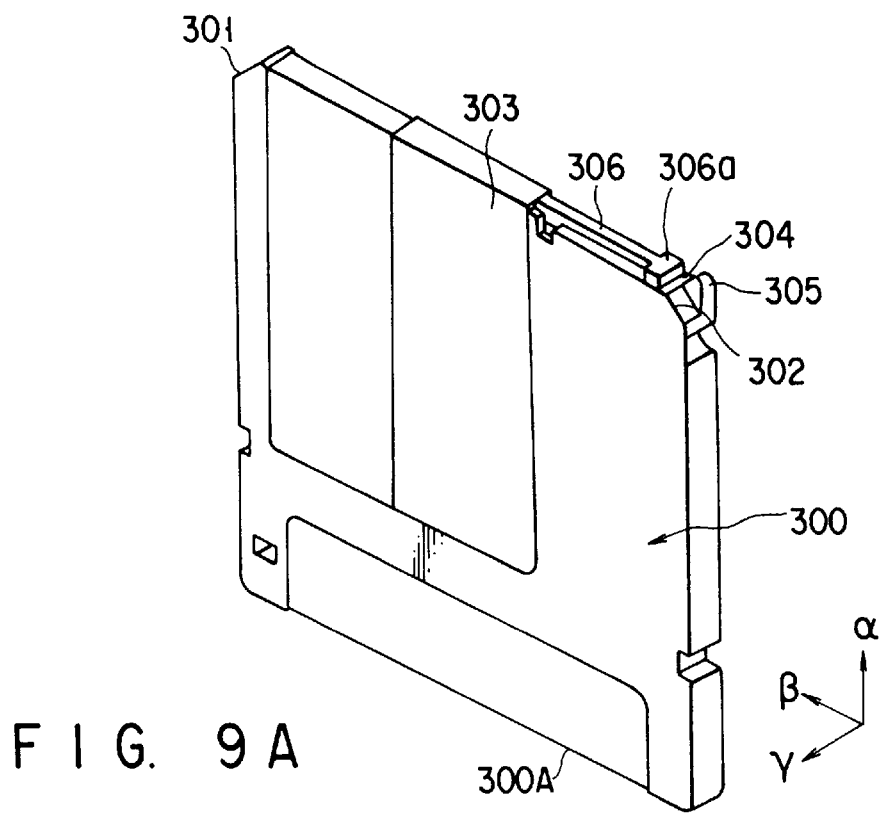
FIGS. 9A and 9B are perspective views showing a double-sided disk cartridge for use in an information recording/reproducing apparatus according to a second embodiment of the present invention, FIGS. 9A and 9B showing different sides of the cartridge.
Figure 9B:
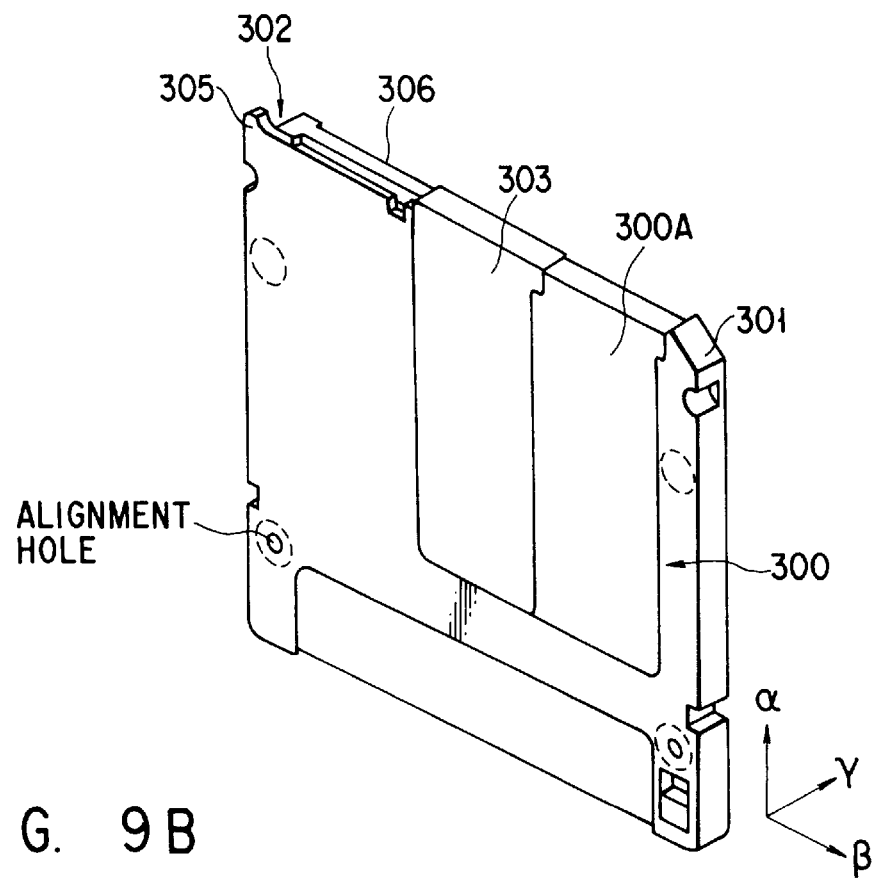
Figure 10A:
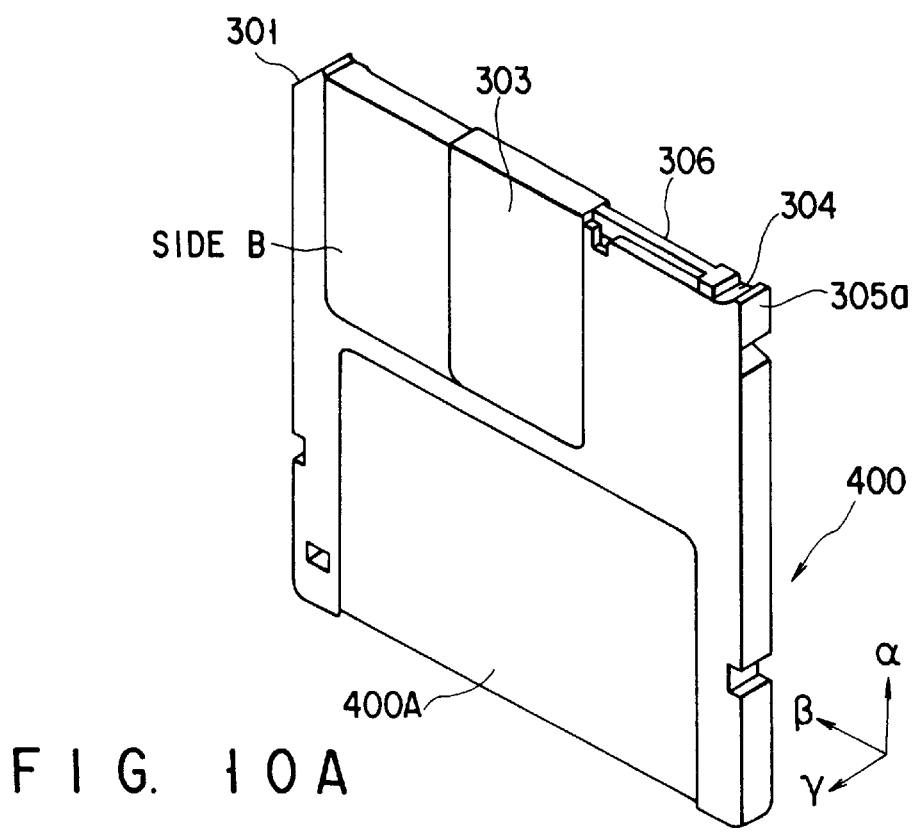
FIGS. 10A and 10B are perspective views showing a single-sided disk cartridge for use in the information recording/reproducing apparatus according to the second embodiment of the present invention, FIGS. 10A and 10B showing different sides of the cartridge.
Figure 10B:
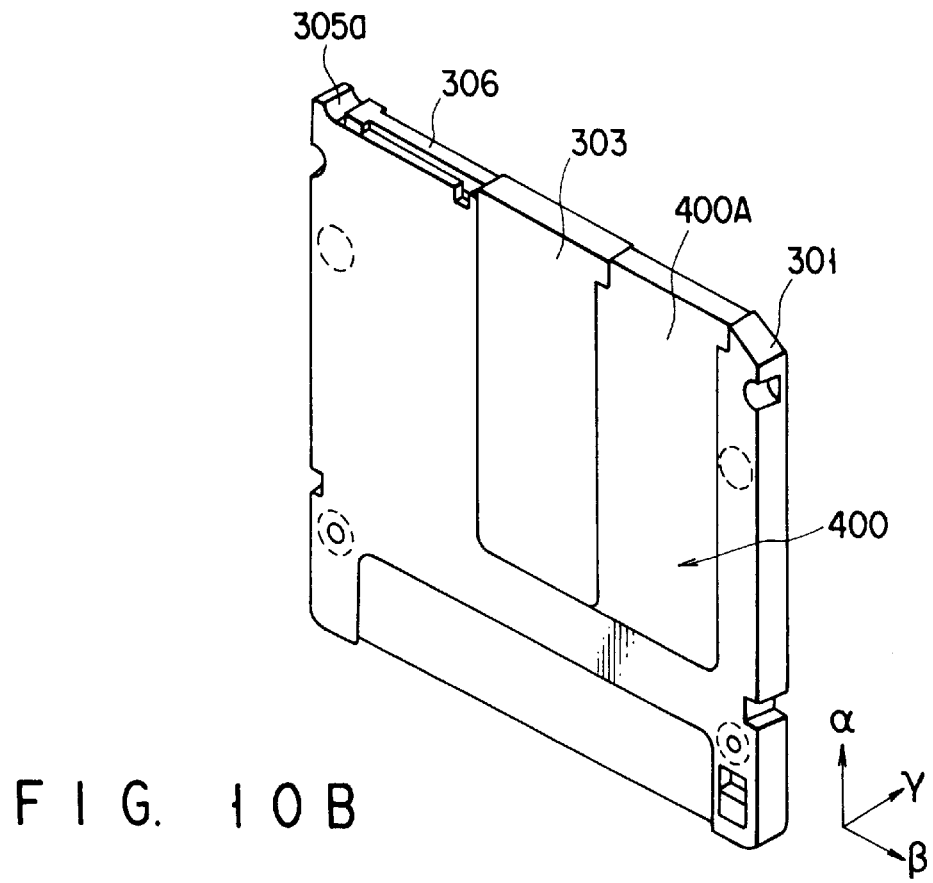

FIGS. 9A and 9B show a disk cartridge (double-sided cartridge) 300 containing a double-sided disk, i.e., a recording medium in which information can be recorded on and reproduced from both sides. FIGS. 10A and 10B show a disk cartridge (single-sided cartridge) 400 containing a single-sided disk, i.e., a recording medium in which information can be recorded on and reproduced from only one side.

The double-sided cartridge 300 comprises a case body 300A having first and second contact surfaces 301 and 302, i.e., chamfered and inclined surfaces at both corners of the front end of the cartridge. The inclinations of the contact surfaces 301 and 302 are the same. However, the first contact surface 301 is formed overall the thickness (in a γ direction) of the disk cartridge, whereas the second contact surface 302 is formed on half the thickness on the B-side, i.e., half the thickness of the cartridge and a projection 305 is formed on the other half.

On the other hand, in the single-sided cartridge 400, only a first contact surface 301 is formed on a case body 400A and a second contact surface 302 is not.

Each of the cartridges 300A and 400A has a shutter opening and closing mechanism different from that of the first embodiment. The mechanism will be described below.

Figure 12A:
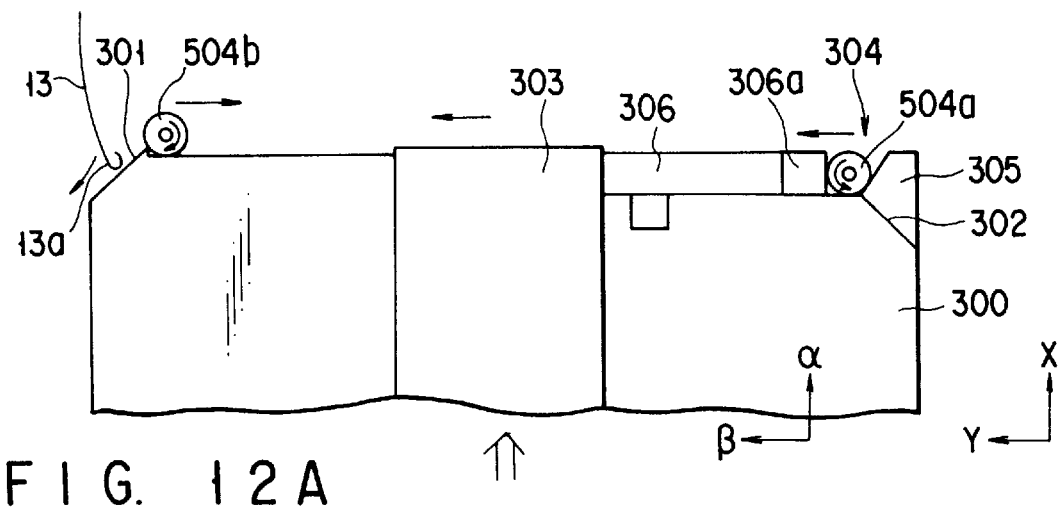
Figure 12B:
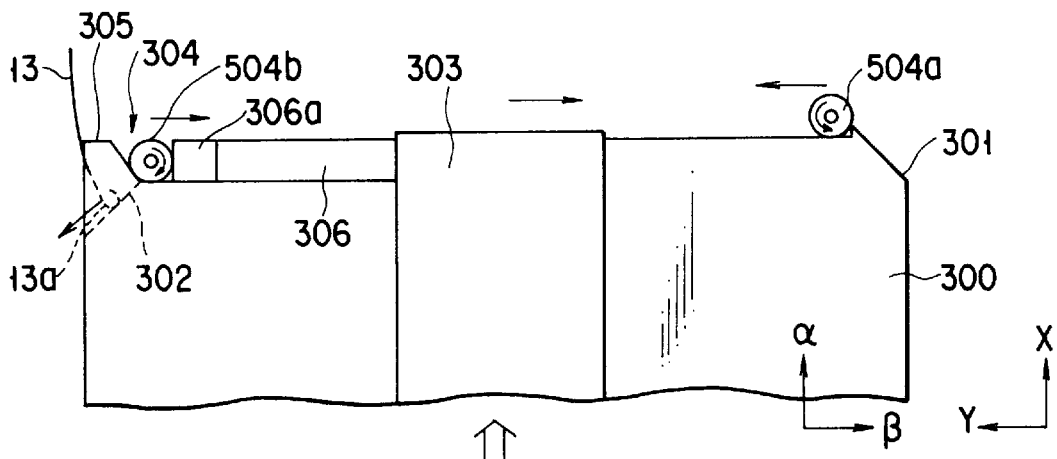
Figure 12C:
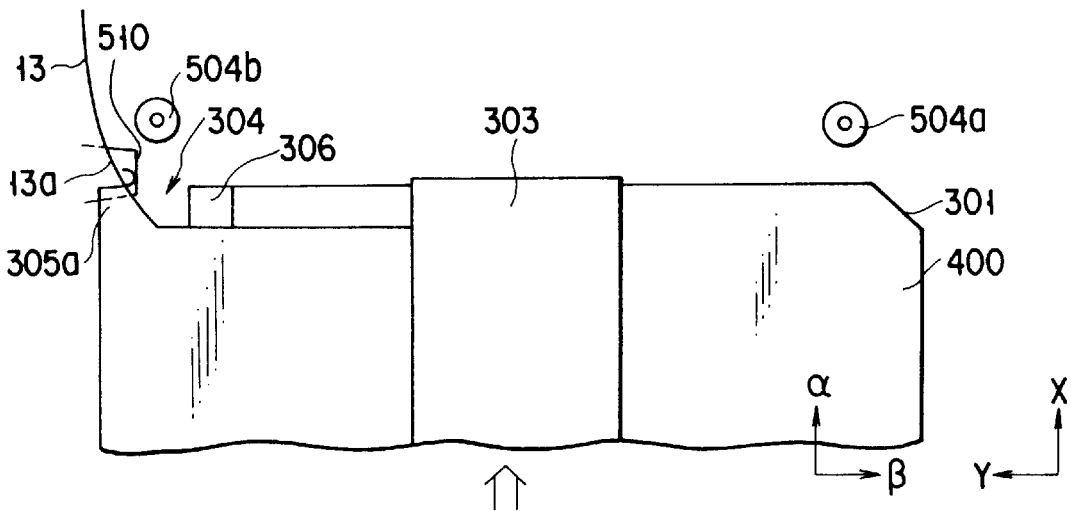

As in the first embodiment, a shutter 303 is slidably mounted on each of the case bodies 300A and 400A so as to be slidable in the width direction of the case body (in the β direction), thereby opening and closing a head spindle window. In FIGS. 12A to 12C, the shutter 303 is maintained in a closed position, biased in the $-\beta$ direction by a compression spring (not shown) provided between a first end of the case body and the shutter 303, instead of the extension spring 105 (shown in FIG. 5). To move the shutter 303 to an opened position against the biasing force of the compression spring, the shutter 303 has a relatively rigid thin plate piece 306 extending in the −β direction, instead of the belt. A thick engaging section 306a is formed in a distal end portion of the thin plate piece 306. The engaging section 306a is slightly separated from the projection 305 in the case of the double-sided cartridge 300 or the projection 305a at the corner on which the contact surface is not formed in the case of the single-sided cartridge 400. As a result, a slot 304 of a shutter opener is defined between the engaging section 306a and each of the projections 305 and 305a. With this structure, the shutter 303 can be opened by moving the engaging section 306a from the side of the slot 304 in the direction indicated by the arrows in FIGS. 12A to 12C (in the +β direction).

Figure 11:
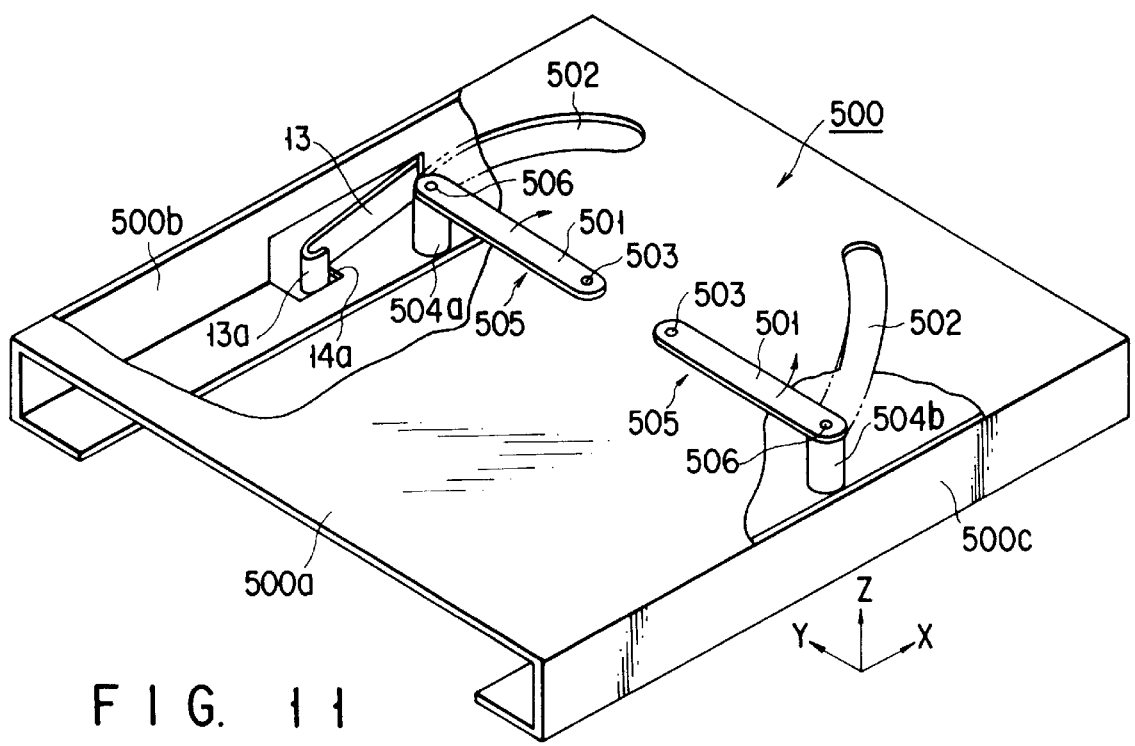
FIG. 11 is a partially cut-out perspective view showing a shutter opening and closing mechanism of the second embodiment.

FIG. 11 shows a cartridge holder 500 to load the disk cartridges 300 and 400 in the information recording/reproducing unit of the information recording/reproducing apparatus.

The dimensions in the Z direction (widths) and positions of a plate spring 13 and a contact portion 13a are set such that the plate spring and the contact portion are located in only the lower half portion (in a −Z direction) of the disk cartridge.

The holder 500 of the information recording/reproducing apparatus comprises a pair of shutter opening mechanisms 505, which are arranged so as to face each other and separated in the Y direction. Each opening mechanism 505 has a rotary arm 501, a proximal end of which is pivotably connected to a central portion of an upper plate 500a by means of a shaft 503. Thus, the opening mechanisms 505 are rotatable in parallel with the upper plate 500a of the holder. The rotary arms 501 extend substantially in the Y direction toward a side plate 500b (500c) of the holder. A roller (504a or 504b) is connected to a lower surface of a distal end portion of the each arm 501 by means of a pin 506 so as to be rotatable. Arc slots 502 are formed in the upper plate 500a along movement locus of the pins 506 according to the rotation of the rotary arms 501 in the directions indicated by the arrows. The rollers 504a, 504b extend to the interior of the holder 500 through the arc slots 502. The length of the rollers is set to substantially the same as the thickness of the disk cartridge (the dimension in the γ direction).

An operation of the aforementioned shutter opening and closing mechanism will be described with reference to FIGS. 12A to 12C.

FIG. 12A shows a case in which the double-sided cartridge 300 is inserted in the cartridge holder 500 in a state where the A-side of a double-sided optical disk is directed to the side of the pickup mechanism. In this case, the contact portion 13a of the plate spring 13 is moved outside the holder by means of the first contact surface 301, so that insertion of the disk cartridge 300 is allowed. As the cartridge is gradually inserted, the roller 504a of the second shutter opening mechanism 505 enters the slot 304 of the shutter opener between the projection 305 and the engaging section 306a of the shutter. Further, as the disk cartridge 300 is moved in the +X direction, the arms 501 are rotated in the direction indicated by the arrows shown in FIG. 11 and the rollers 504a, 504b are guided along the arc slots 502. As a result, the engaging section 306a is moved by the roller 504a in the direction indicated by an arrow in FIG. 12A, so that the shutter 303 is moved in the same direction against the biasing force of the compression spring to the opened position. During the above operation, the roller 504b of the first shutter opening mechanism 505 is moved in the −β direction as indicated by an arrow shown in FIG. 12A, while rotating, and reaches to the front edge of the shutter 303. Thus, the double-sided cartridge 300 is inserted in the holder 500 into the load position without being prevented by the plate spring 13. In addition, the shutter is opened by means of the second shutter opening mechanism 505 without interference by the first shutter opening mechanism 505.

FIG. 12B shows a case in which the double-sided cartridge 300 is inserted in the cartridge holder 500 in a state where the B-side of a double-sided optical disk is directed to the side of the pickup mechanism. In this case, since the contact portion 13a of the plate spring 13 is brought into contact with the second contact surface 302, the contact portion 13a is moved outside the holder by means of the contact surface 302, so that insertion of the disk cartridge is allowed.

This time, the roller 504b of the first shutter opening mechanism 505 enters the slot 304, so that the engaging section 306a is moved in the −Y direction as indicated by an arrow shown in FIG. 12B, thereby opening the shutter.

If the second contact surface 302 is chamfered over all the thickness of the case body like the first contact surface 301 so as not form a projection 305, the slot 304 is not formed. In this case, when the roller 504b of the first shutter opening mechanism 505 is brought in contact with the front end of the case body, the roller 504b may abut on the second contact surface 302 due to design errors or may roll along this contact surface off the cartridge. Accordingly, the cartridge cannot be inserted and the shutter cannot be easily opened. To prevent this, in this embodiment, the inclined contact surface 302 and the projection 305 are formed in one corner of the case body. A small projection formed between the front end of the case body and the first inclined contact surface 301 also has the same function as that of the projection 305.

FIG. 12C shows a case in which the cartridge 400 is inserted in the cartridge holder 500 with the B-side of a single-sided optical disk directed to the side of the pickup mechanism. In this case, since a corner of the case body is not chamfered, the contact portion 13a of the spring plate 13 abuts on the projection 305a of the case body remaining in the overall thickness, and presses it in the +X direction. However, since the lower projection of the contact portion 13a is engaged with the cut portion 14a, further insertion of the cartridge 400 is prevented as in the first embodiment, and the operator can recognize that the cartridge is inserted with the recording/reproducing surface directed in the wrong direction.

When the single-sided cartridge 400 is inserted in the cartridge holder 500 with the A-side of the single-sided optical disk directed to the side of the pickup mechanism, it is inserted in the load position in the same manner as in the case shown in FIG. 12A.

In the information recording/reproducing apparatus of this embodiment, the inclined contact surface for preventing wrong insertion is formed only in part of the corner of the disk cartridge divided in the thickness direction. Therefore, for example, other function portions, such as a shutter opening slot, can be formed in part of the cartridge divided in the thickness direction. Accordingly, a number of function portions can be formed in a smaller area.

As regards the disk cartridge 400 of the single-sided optical disk, the shutter 303 on the B-side and the window covered by the shutter are smaller than those on the A-side, and do not reach to the motor portion. For this reason, if the disk cartridge is inserted in the information recording/reproducing apparatus in the wrong direction with the B-side directed to the side of the pickup mechanism, the cartridge 400 may be brought into contact with the motor and the cartridge and the motor may be damaged. In addition, since the disk cartridge 400 is not completely moved to the motor side when loaded in the recording/reproducing unit, inconvenience that the cartridge cannot be taken out may be caused.

In contrast, according to the present invention as described above, since the wrong insertion preventing means are provided in the apparatus and the disk cartridge, the aforementioned inconvenience is not caused. The shapes of the optical disk, the disk cartridge, the disk cartridge holder, and so on are not limited to those as used in the above embodiments but other shapes can be applied. For example, the single-sided optical disk 120B may have the same structure as that of the two single-sided optical disks constituting the double-sided optical disk. Further, in the above embodiments, the double-sided optical disk 120A has the central portion to be mounted on the turn table 51, thicker than the peripheral portion in which information is recorded. However, the central portion may have the same thickness (0.6 mm) as that of the peripheral portion. In this case, the total thickness of the double-ended cartridge 100 can be reduced.

The information recording/reproducing apparatus of the present invention is not limited to the above embodiment, but can be various modified as will be described below.

Figure 13:
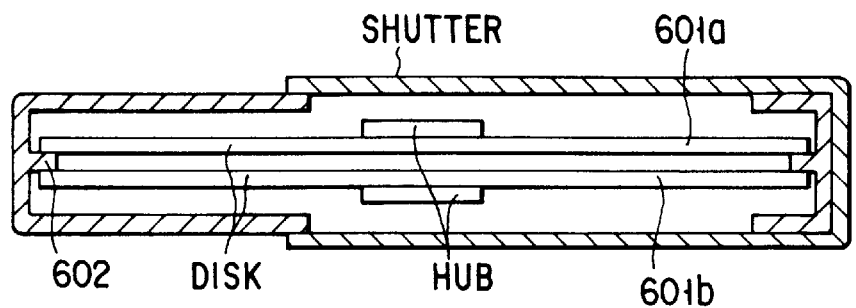
FIG. 13 is a schematic view showing a modification of a double-sided disk cartridge.

As shown in FIG. 13, the same single-sided optical disks 601a and 601b may be held in a case body 603, one above the other, so that the recording surfaces of the respective disks may not in contact with each other by means of a partitioning plate 602 located between the peripheral edge portions of the disks, thereby forming a double-sided cartridge 604. In this case, when one of the optical disk 601a and 601b is rotated to perform a recording or reproducing operation, the rotational force is not transferred to the other optical disk. Thus, since it is unnecessary to adhere the single-sided optical disks 601a and 601b with each other, the manufacturing cost can be reduced. In addition, since the rotational load of the motor can be little, a smaller motor is enough to rotate the optical disk. A single-sided cartridge contains one single-sided optical disk, whereas a double-sided cartridge contains two single-sided optical disk. Although the two types of cartridges contain different number of disks, the disks are of the same type. Therefore, two types of cartridges can be made of one basic type of optical disks, which reduces the manufacturing cost of disks. disks. Moreover, since two single-sided optical disks can be paired together to form a double-sided optical disk, information can be managed efficiently, for example, contents can be recorded in two disks in one cartridge.

Further, the wrong insertion preventing mechanism is not limited to the plate spring, but can be formed of a lever or an electrical switch and a solenoid.

Figure 14:
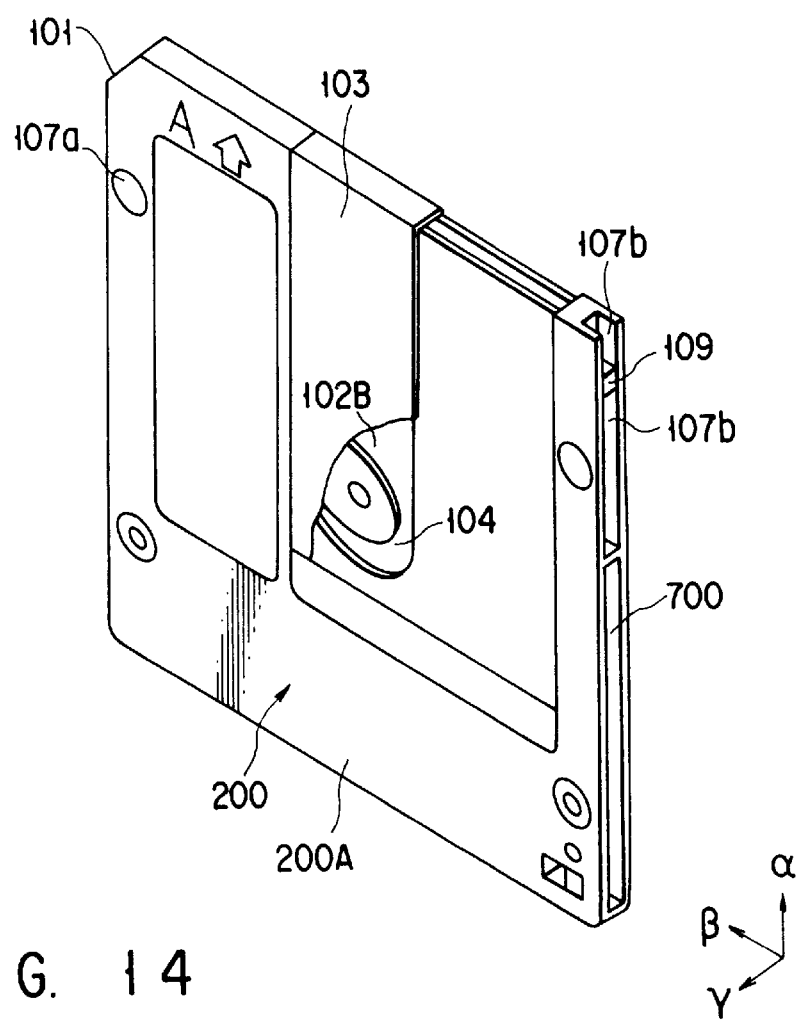
Figure 16:
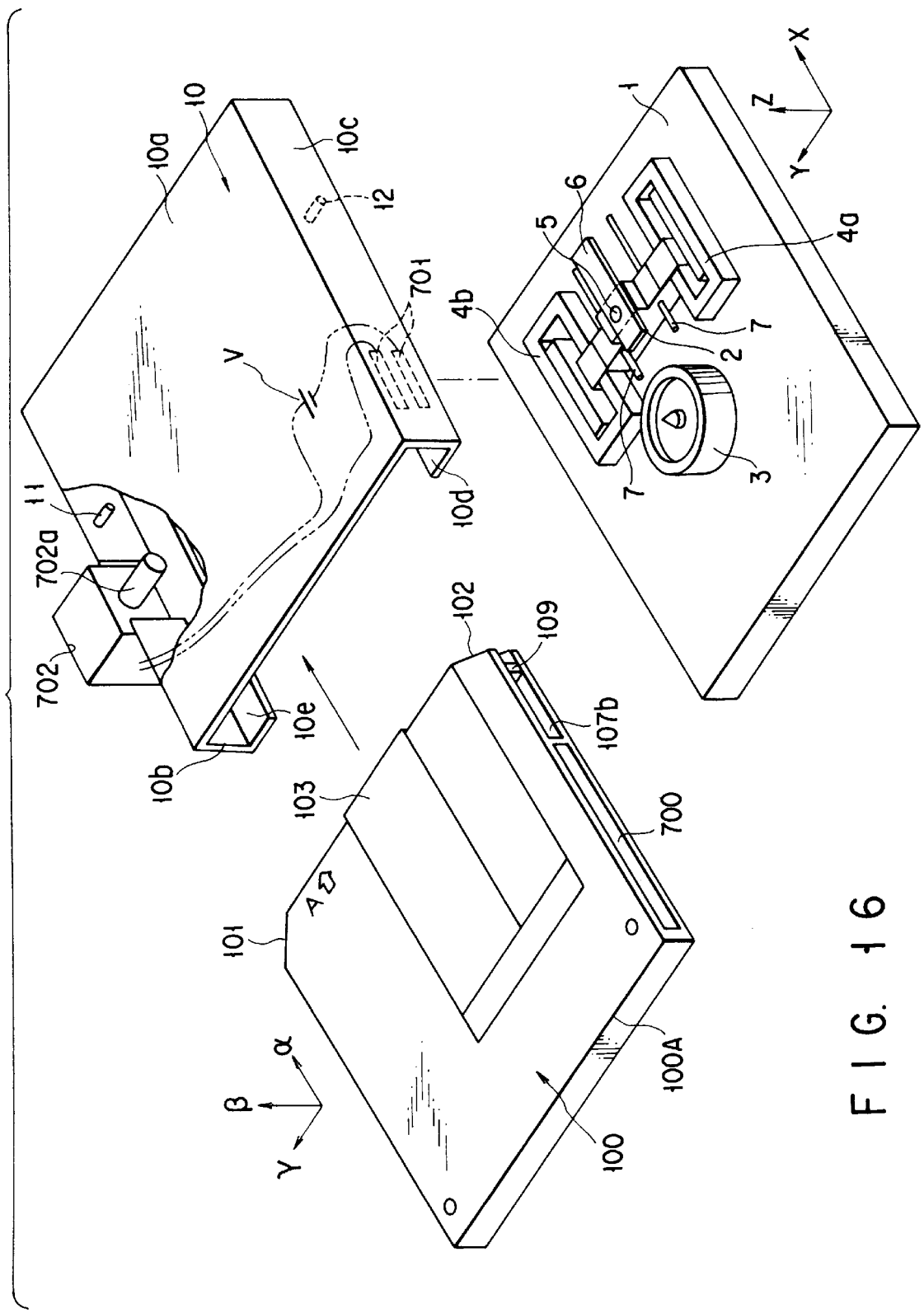

The wrong insertion preventing mechanism is not limited to an elastic material, such as a plate spring, but can be formed of the combination of an electrical contact (switch) 700 and a solenoid mechanism 701, as shown in FIGS. 14 to 16.

In FIGS. 14 to 16, the same elements substantially equivalent to those used in the above embodiments are identified by the same reference numerals as used in these embodiments, and detailed descriptions thereof will be omitted.

FIG. 14 shows a single-sided cartridge 200, and FIGS. 15A and 15B show a double-sided cartridge 100. In the single-sided cartridge 200, an electrical contact 700 is formed on one of the sides of a case body 200A, in which a slot 107b is formed. In the double-sided cartridge 200, electrical contacts 700 are respectively formed on the sides of a case body 100A. One end of each electrical contact is located near the slot and the other end thereof is located near the rear end of the case body. The electrical contact is formed of elongated metal foil extending in the direction in which the cartridge is inserted. The metal foil may be attached to the side of the case body or embedded in the side.

As shown in FIG. 16, a cartridge holder 10 has a pair of parallel contacts 701 arranged on the inner surface of a second side plate 10c near the cartridge inserting port. The contacts may be contact brushes formed of plate springs, each having one end fixed to, for example, the side plate 10c and the other end curved and extending in the holder. In the middle portion of the first side plate 10b, a wrong insertion preventing mechanism formed of a solenoid mechanism 702 is provided. The mechanism 702 comprises a housing attached to the outer surface of the side plate 10b, a solenoid encased in the housing, and a movable rod 702a movable in Y directions by turning on and off the current supplied to the solenoid. As shown in FIG. 16, normally (when the solenoid is off), the movable rod 702a is positioned, by means of a spring in the housing, at an insert preventing position in which the rod is extending from the housing to the interior of the holder. Therefore, when the cartridge is inserted in the holder in this state, the front side of the cartridge is brought into contact with the side surface of the movable rod 702a, thereby preventing the cartridge from being further inserted. On the other hand, when the solenoid is on, the movable rod 702a is positioned at an insert allowing position, i.e., within the housing, against the biasing force of the spring. As a result, the cartridge inserted in the holder is not prevented by the movable rod and moved to the load position.

The solenoid 702 and the pair of contacts 701 are electrically connected to each other via a power source V. When the contacts 701 are electrically connected to each other, a current is supplied from the power source V to the solenoid 702, which is then turned on.

An operation of inserting a single-sided cartridge and a double-sided cartridge in the aforementioned cartridge holder will be described with reference to FIG. 16.

First, a case of inserting the double-sided cartridge 100 will be described. When the double-sided cartridge is inserted in the cartridge holder 10 with the side A directed upward, the electrical contact 700 on the side of the cartridge, in which the slot 107b is formed, is brought into contact with the pair of electrical contacts 701 formed on the cartridge holder. The contacts 701 are electrically connected to each other via the contact 700, thereby switching on the solenoid. When the solenoid is switched on, the movable rod 702a is moved in the +Y direction (in FIG. 16) to the position where the cartridge is allowed to be inserted (the insert allowing position), thereby releasing the wrong insertion prevented state. Thus, the double-sided cartridge can be inserted in the load position of the cartridge holder with the A-side directed upward. To withdraw the cartridge from the holder, when the electrical contact between the contact 700 of the cartridge and the contacts 701 of the holder is released, the solenoid is turned off, so that the movable rod 702a is moved to the insert preventing position by the spring. In the same manner as described above, when the double-sided cartridge is inserted with the B-side directed upward, the contacts 701 on the holder are turned on via an electrical contact formed on the side on which a slit 107a is formed, thereby exciting the solenoid.

A case of inserting the single-sided cartridge will now be described. When the single-sided cartridge is inserted in the cartridge holder with the side A directed upward, the electrical contact on the cartridge is brought into contact with the electrical contacts on the cartridge holder. As a result, the solenoid is switched on and the movable rod 702*a* is moved in the +Y direction to the position where the cartridge is allowed to be inserted, thereby releasing the wrong insertion prevented state. Thus, the insertion of the cartridge is allowed. On the other hand, when the single-sided cartridge is inserted in the cartridge holder with the B-side directed upward, since no electrical contact is formed on the side in which the slot 107*a* is formed, the pair of contacts 701 is not turned on by the insertion of the cartridge. Therefore, the solenoid is not excited. In other words, the insertion preventing portion of the solenoid (the movable rod 702*a*) is kept in the cartridge inserting path in the cartridge holder and brought into contact with the front end of the cartridge, thereby preventing the cartridge from being further inserted. Thus, wrong insertion of the cartridge is prevented.

Figure 19:
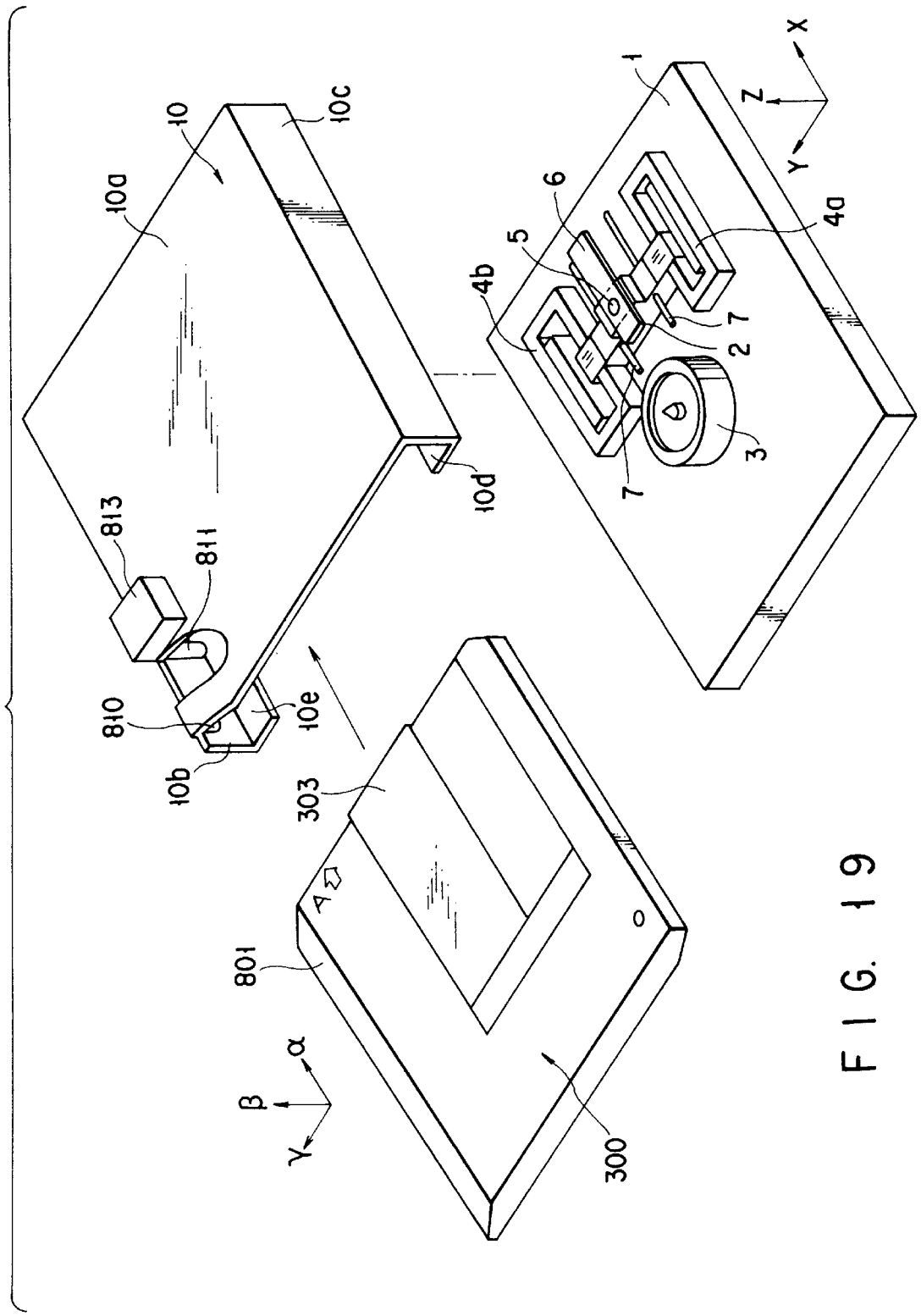

Another example of the wrong insertion preventing means will be described with reference to FIGS. 17 to 19.

As shown in FIG. 17, a single-sided cartridge 400 (the same type as that shown in FIGS. 10A and 10B) has a cut slant portion 800, extending in substantially the overall length of the cartridge, at the corner defined by one side of the cartridge and the A-side. As shown in FIG. 18, a double-sided cartridge 300 (the same type as that shown in FIGS. 9A and 9B) has a cut slant portion 801, extending in substantially the overall length of the cartridge, at the corner defined by one side of the cartridge and the A-side, and a cut slant portion 802, extending in substantially the overall length of the cartridge, at the corner defined by the other side of the cartridge and the B-side.

The cartridge holder has substantially the same structure as that shown in FIG. 11 except the wrong insertion preventing means. The former is different from the latter in that a push switch 810 is formed on an upper plate 10*a* of the cartridge near an inserting port thereof on the Y side, as shown in FIG. 19. The push switch 810 slightly projects downward below the upper plate 10*a*. The amount of projection is a little smaller than the amount of the cut of the cartridge. The switch is turned on when pushed, so that a solenoid (to be described below) is excited via a power source. On the downstream side of the push switch on the upper plate 10*a*, there are the solenoid and a lock pin or movable rod 811. The solenoid is encased in a housing 813 and turned on and off in accordance with an output from the push switch. The movable rod 811 is driven by the solenoid, so that it can project into the cartridge inserting path. When the solenoid is excited, the lock pin is moved down in the holder to the lock position and brought into contact with the front end of the cartridge, thereby preventing the cartridge from being further inserted. When the push switch is not pushed, the lock pin is biased upward by a spring and kept in the housing, so that insertion of the cartridge is allowed. The electric interconnection between the push switch and the lock pin is substantially the same as that described with reference to FIG. 16, and the description is not repeated here.

An operation of inserting the double-sided cartridge 300 shown in FIG. 18 into the above cartridge holder will be described with reference to FIG. 19. When the double-sided cartridge is inserted in the holder with the A-side directed upward, since the push switch 810 of the cartridge holder is not pushed due to the existence of the cut slant portion 801 formed in the cartridge, the switch is kept in an off state. Therefore, the solenoid is not excited and the lock pin 811 is maintained in the housing by the biasing force of the spring, so that the insertion of the cartridge is allowed. Similarly, when the double-sided cartridge is inserted with the B-side directed upward, since the push switch is not pushed, the insertion of the cartridge is allowed.

An operation of inserting the single-sided cartridge 400 shown in FIG. 17 into the above cartridge holder will now be described. Similar to the case of the double-sided cartridge, when the cartridge is inserted with the A-side directed upward, since the cut slant portion 800 is formed in the cartridge, the push switch 810 is not pushed. Therefore, the insertion of the cartridge is allowed.

However, when the cartridge is inserted with the B-side directed upward, since a cut slant portion is not formed on the B-side, the push switch 810 is pushed by the surface of the cartridge. As a result, the solenoid is excited and the lock pin 811 is moved down into the holder, thereby preventing the cartridge from being further inserted in the holder. In short, the wrong insertion is prevented.

As described above, it is possible to use anything that functions as the wrong insertion preventing mechanism, for example, the combination of the electrical contacts and the solenoid or the combination of the push switch and the lock pin. The positions of the push switch (the electrical contact) and the solenoid are not limited to those as described above. For example, the solenoid of the mechanism 702 shown in FIG. 1 may be arranged on the side plate 10*c* on which the pair of contacts 701 is provided. Further, the type and position of the electrical contacts may be easily modified by a person skilled in the art.

The releasing portion for releasing the wrong insertion preventing mechanism is not limited to the inclined chamfer surface, but can be anything that can act on the wrong insertion preventing mechanism, for example, a projection for pushing a lever or an electrode which acts on the electronic contacts. Further, the recording medium is not limited to an optical disk, but can be any other types of medium, such as a compact disk, a photomagnetic disk, a phase change recording medium, a magnetic disk, and the like. The recording/reproducing mechanism can be suitably modified in accordance with the type of the recording medium.

With the information recording/reproducing apparatus according to the present invention, it is possible to load two types of cartridges (a cartridge containing a single-sided recording medium and a double-sided recording medium) in the recording/reproducing mechanism, and to record or reproduce information on or from the medium in the cartridge of the two types. In addition, it is possible to prevent wrong insertion of the cartridge with the non-recording surface of a single-sided recording medium directed to the side of the recording/reproducing medium. Therefore, the recording medium and the recording/reproducing mechanism are prevented from damage. Moreover, it is possible to avoid waste of time to notice that a recording/reproducing operation cannot be performed only after the cartridge has been loaded in the apparatus.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A disc cartridge apparatus and disc cartridge system comprising:

a holder for holding a cartridge inserted therein and loading the inserted cartridge into a load position, the holder being capable of holding both a single-sided cartridge containing a recording medium having a recording surface on one side thereof and a double-sided cartridge containing a recording medium having recording surfaces on both sides thereof, a thickness of the double-sided cartridge being the same as that of the single-sided cartridge;

a recording/reproducing mechanism, arranged to face one surface of the recording medium loaded in the load position, for recording/reproducing information on/from the one surface; and a wrong insertion preventing mechanism for, (i) when a single-sided cartridge is inserted in the holder such that a non-recording surface faces the recording/reproducing mechanism, detecting the insertion and preventing the cartridge from being loaded into the load position, and (ii) when a double sided cartridge is inserted in the holder or a single-sided cartridge is inserted in the holder such that the recording surface faces the recording/reproducing mechanism, detecting the insertion and allowing the cartridge to be loaded into the load position; and wherein the wrong insertion preventing mechanism comprises a detector for detecting a single-sided cartridge and a double-sided cartridge, a preventing member attached to the holder and having an insert preventing function and an insert allowing function wherein the preventing member is movable between an insertion preventing position for preventing insertion of the cartridge and an insertion allowing position for allowing insertion of the cartridge, and a solenoid which causes the preventing member to move to the insertion preventing position and to the insertion allowing position, responsive to an output from the detector.

2. The information recording/reproducing apparatus according to claim 1, wherein the holder comprises a holder unit, through which the cartridge is inserted and which has a side wall extending in a direction in which the cartridge is inserted, and the preventing member is formed on the side wall of the holder.

3. The information recording/reproducing apparatus according to claim 2, wherein the preventing member is biased in the insert preventing position.

4. The information recording/reproducing apparatus according to claim 3, wherein the insert preventing position is inside an insert path of the cartridge in the holder unit and the insert allowing position is outside the insert path of the cartridge.

5. The information recording/reproducing apparatus according to claim 4, wherein the preventing member comprises a first end fixed to the holder and a second end located at the insert preventing position.

6. The information recording/reproducing apparatus according to claim 5, wherein the preventing member has a plate spring rotatable on one end thereof.

7. The information recording/reproducing apparatus according to claim 6, wherein the plate spring extends in a direction of the thickness of the cartridge.

8. The information recording/reproducing apparatus according to claim 7, wherein the plate spring has a width in a height direction substantially the same as the width in a thickness direction of an inclined contact surface formed in a front end portion of the cartridge.

* * * * *